United States Patent

[11] 3,621,294

[72] Inventor Rodger A. Cliff
College Park, Md.
[21] Appl. No. 779,025
[22] Filed Nov. 26, 1968
[45] Patented Nov. 16, 1971
[73] Assignee The United States of America as represented by the Administrator of the National Aeronautics and Space Administration

[54] SCR LAMP DRIVER
7 Claims, 3 Drawing Figs.

[52] U.S. Cl. .......... 307/252 N, 307/252 R, 307/259, 307/305
[51] Int. Cl. .......... H03k 17/00
[50] Field of Search .......... 307/252, 305, 215, 259

[56] References Cited

UNITED STATES PATENTS

| | | | |
|---|---|---|---|
| 3,176,161 | 3/1965 | Vertrees | 307/252 |
| 3,316,470 | 4/1967 | Scott | 307/252 |
| 3,320,473 | 5/1967 | Grafham | 307/252 |
| 3,456,084 | 7/1969 | Haselton | 307/252 |
| 3,143,664 | 8/1964 | Lourie | 307/259 |
| 3,192,396 | 6/1965 | Hasdorff | 307/215 |

OTHER REFERENCES

G. E. Application Note, F. W. Gutzwiller, 6–61, p. 5

*Primary Examiner*—Donald D. Forrer
*Assistant Examiner*—David M. Carter
*Attorneys*—R. F. Kempf, E. Levy and G. T. McCoy

ABSTRACT: A voltage amplitude-responsive trigger circuit includes a silicon-controlled rectifier having its gate electrode biased through a first diode by a DC source. The DC source applies current through a second diode, connected in opposed relationship to the first diode, to a variable amplitude-signal source. To change the input voltage at which the SCR triggers, a plurality of diodes may be connected between the DC source and the gate electrode or a DC voltage may be connected in series with the SCR cathode.

Figure 1:
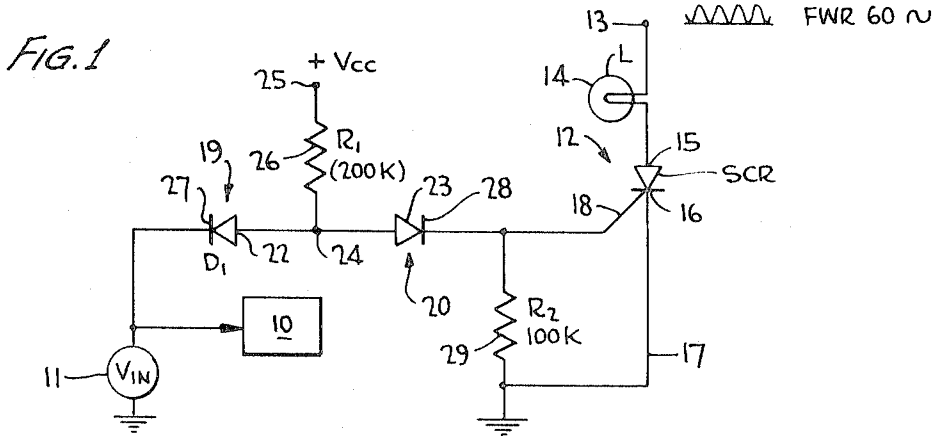

INVENTOR,
RODGER A. CLIFF
BY
Carl Levy
ATTORNEY

SCR LAMP DRIVER

The invention described herein was made by an employee of the U.S. Government and may be manufactured and used by or for the Government for governmental purposes without the payment of any royalties thereon or therefor.

The present invention relates generally to semiconductor networks and, more particularly, to an amplitude-responsive trigger circuit including a silicon-controlled switch having a gate electrode connected to a signal source via a pair of opposed, series-connected diodes selectively forward-biased by a DC source.

The high impedance characteristics of low-power integrated circuits, as well as the low current-carrying characteristics thereof, present difficult problems with regard to driving lower impedance, high-power devices, such as indicator lamps or relays. The problem has been found particularly troublesome in designing indicators for use with integrated circuits of the low-power current-sinking logic-type. In addition to the problems encountered with regard to loading the output of an integrated circuit, the cost of suitable prior art devices has been relatively great because of the complex nature of networks which attempted to minimize loading.

A seemingly inexpensive and facile manner of driving a high-power load in response to output signals generated by integrated circuits is to couple a silicon-controlled rectifier (SCR) between the signal source and load so that the source drives a gate electrode of the SCR and the load is in the SCR anode circuit. Two problems, however, exist to this solution. In particular, the gate impedance of a fired SCR is low enough to load appreciably the output circuit of an integrated circuit and prevent proper fan-out of signals from the circuit comprising the source to other loads. A further, and perhaps more serious problem, in connecting SCR's as integrated circuit loads is that the voltage at the SCR gate electrode jumps suddenly by +0.3 volts as the SCR is triggered. The +0.3-volt jump is coupled back to the integrated circuit output terminal and can serve as a false trigger for other voltage-responsive integrated circuits driven by the same integrated circuit as the SCR. Hence, these other integrated circuits can be activated to an incorrect state in response to the SCR being energized to a fired status.

In accordance with the present invention, there is provided a circuit for enabling an SCR, and a low-impedance load in the anode circuit thereof, to be driven by the output of an integrated circuit through an inexpensive diode isolation network without the above-mentioned deleterious effects. The integrated circuit output is coupled to the SCR gate electrode via a pair of diodes, connected in opposed relationship to a signal source being monitored. Like electrodes of the diodes are connected together and to a bias source capable of simultaneously forward-biasing both of them. In response to the signal source amplitude being less than a predetermined amplitude, the diode connected directly to the SCR gate electrode decouples the SCR from the load being driven, while the other diode decouples the load from the SCR after the SCR has been fired. Thereby, isolation between the signal source controlling the SCR and the SCR is achieved for both amplitude levels of the source so that SCR impedance and voltage level decoupling prevails. Thereby, the possibility of erroneous activation of other integrated circuits in response to the state of the SCR is prevented.

While oppositely poled diode pairs have been utilized extensively in the past in diode transistor logic (DTL) networks, the application thereof to driving SCR gate electrodes produces a result materially different from that attained in logic networks. In DTL, oppositely poled diodes are necessary to balance the voltage drop occurring in response to an input diode being triggered, whereby the voltage level necessary to trigger the output transistor can be positively coupled to the transistor. In the prior art DTL networks there are no problems anent impedance or voltage decoupling since an integrated circuit transistor base is not a substantial load on another integrated circuit transistor nor does it have a tendency to jump suddenly when the transistor is activated. Of course, it is more desirable to utilize SCR's rather than power transistors as low impedance drivers for economic reasons.

The input-firing voltage, i.e., the signal source voltage required to activate the SCR into a conductive state, can be controlled at will in accordance with two separate embodiments of the invention. In accordance with one embodiment, the input-firing voltage can be changed by varying the cathode to ground voltage applied to the SCR by a DC source, while in a second embodiment the input-firing voltage is controlled by including a plurality of diodes directly in series with the SCR gate electrode.

The characteristics of silicon-controlled rectifiers are temperature-dependent, whereby for increasing temperatures, the current and voltage which must be applied to the SCR gate electrode in order to trigger it into conduction decrease. Frequently, these temperature-dependent characteristics have prevented the use of SCR's in environments susceptible to unpredictable variations. The network of the present invention, however, is capable of stable operations over a wide temperature range, between −50° C. and =100° by judicious choice of circuit parameters. The wide temperature range for which the circuit is susceptible to operation enables it to be mounted on a printed circuit board carrying an integrated circuit which will be subjected to environmental extremes. This obviates the requirement of certain prior art circuits for relatively long leads between the integrated circuit and the indicator.

The wide temperature range for the circuit operation is achieved by suitable selection of bias resistors connected to the control gate and cathode. In particular, it has been found that a resistor having a value on the order of 100k. ohms shunting the gate cathode path of the SCR, in combination with a resistor having a value of 200K ohms in circuit with a 5-volt DC bias supply for the diodes enables the SCR to function over the stated temperature range.

It is, accordingly, an object of the present invention to provide a new and improved amplitude-responsive trigger circuit particularly adapted to be utilized in conjunction with low-power signals sources.

An additional object of the present invention is to provide a diode circuit for isolating the impedance and voltage levels of a fired SCR from an integrated circuit driver and other integrated circuits responsive to the driver.

Another object of the invention is to provide a new and improved amplitude-responsive trigger circuit which neither draws appreciable current from a digital circuit nor requires it to sink appreciable current and which thereby does not adversely effect the circuit operation.

Another object of the present invention is to provide a new and improved amplitude-responsive trigger circuit adapted for driving high-power loads, such as lamps or relays, which is capable of operating over a wide temperature range and has a relatively low cost.

Figure 2:
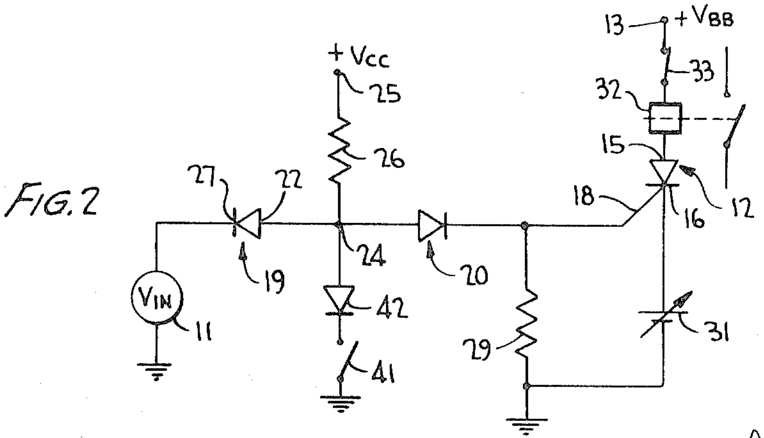
Figure 3:
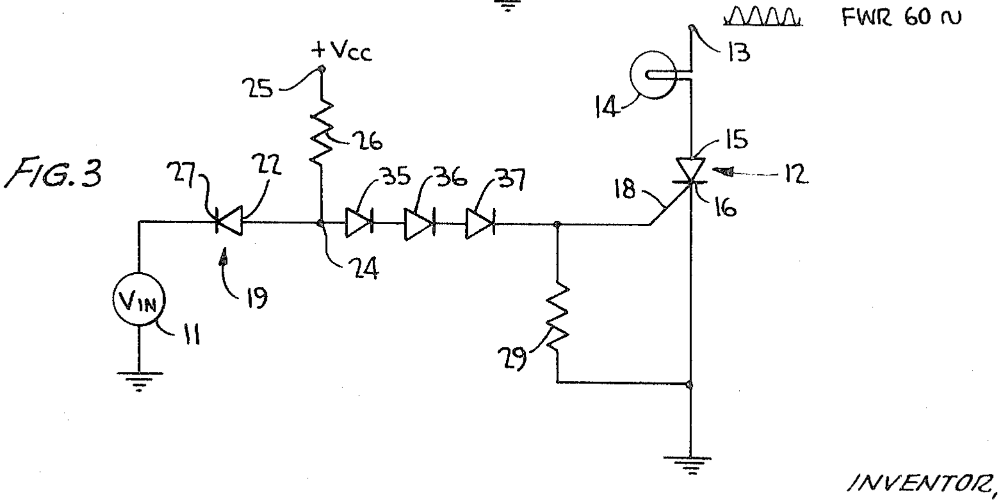

The above and still further objects, features and advantages of the present invention will become apparent upon consideration of the following detailed description of several specific embodiments thereof, especially when taken in conjunction with the accompanying drawings, wherein:

FIG. 1–3 are circuit diagrams of three different embodiments of the present invention.

Reference is now made to the embodiment of FIG. 1 wherein the voltage amplitude of digital signal source or generator 11, which is of the high impedance, low-power type, is monitored by a network including a silicon-controlled switch, specifically silicon-controlled rectifier (SCR) 12, which in a preferred embodiment of the invention is of the 2N5060 type. Generator 11 is a binary source, as typically exists at the collector of low-power current-sinking integrated circuits, such as the Fairchild LPDT $\mu$ L integrated circuits. Typically, the amplitude of source 11, $V_{in}$, varies between the limit of ground potential and a voltage of 5.0 volts to represent the two binary states. The signal derived from the integrated circuit source 11 is also fed to the input terminal of other voltage-responsive integrated circuits, indicated by reference numeral 10.

In contrast to the low-power nature of circuit 10 and source 11, SCR 12 is a relatively high-power device, being driven by a full wave-rectified 60 cycle AC supply which is coupled to anode 15 via terminal 13 and incandescent lamp 14. The cathode 16 of SCR 12 is connected directly to ground via lead 17. In the fired state, silicon-controlled rectifier 12 supplies sufficient current, on the order of 0.5 amperes, to lamp 14 to enable the lamp to be illuminated and supply a visual indication of the state of source 11. In contrast, the typical current derived from or sunk by source 11 is in the microampere region.

To control the switching of gate electrode 18 of SCR 12, source 11 is connected in a DC circuit to the SCR gate electrode via diodes 19 and 20. Diodes 19 and 20 are connected so that their anodes 22 and 23 have a common junction at terminal 24, which is connected to a +5-volt DC source at terminal 25 via resistor 26 having a value of 200,000 ohms. The positive voltage at terminal 25 feeds a current of approximately 25 microamperes into terminal 24 to selectively forward-bias silicon diodes 19 and 20, depending upon the voltage of source 11 and the state of the SCR. Cathodes 27 and 28 of diodes 19 and 20, respectively are connected to the ungrounded terminal of source 11 and the gate electrode 18 of SCR 12.

To shunt leakage current of gate electrode 18 to ground and prevent the possible accumulation of charge on the gate electrode, which could result in false triggering of SCR 12, the SCR gate electrode is shunted to ground through resistor 29, having a value of 100,000 ohms. The value of resistor 29 is selected, in combination with the value of resistor 26, to enable SCR 12 to be accurately triggered over a temperature range of −50° C. to +100° C., as is discussed in greater detail infra.

To describe the operation of the circuit, initially assume that the voltage of low-impedance source 11 is zero, i.e., $V_{in}=0$. With $V_{in}=0$. virtually all of the current supplied by the DC source at terminal 25 through resistor 26 is shunted to ground through the anode-cathode path of diode 19 since the diode 19 is forward-biased by the potential at terminal 25. Simultaneously, a high-impedance path exists between cathode 28 of diode 20 to ground through resistor 29 and the parallel path comprising the diode formed by the silicon junction between gate electrode 18 and cathode 16. Under the stated conditions, the anode-cathode path between electrodes 15 and 16 of SCR 12 remains open-circuited and insufficient current flows through lamp 14 to enable it to be lit. Diode 20 is in a nonconducting state, whereby the SCR 12 is completely decoupled from the source 11 and does not load it or short-circuit the input terminal of the other integrated circuit 10.

Next, consider that the voltage $V_{in}$ of source 11 increases. As the voltage amplitude of source 11 increases, the voltage at terminal 24 is similarly raised since a low impedance exists through the forward-biased path of diode 19. The forward-bias of diode 19 results from the current fed thereto by the DC source at terminal 25. Diode 20 is also forward biased by current from the DC source at terminal 25. Since the voltage drop across forward-biased diode 19 is approximately the same as the voltage drop across forward-biased diode 20, the SCR gate voltage is substantially the same as the voltage of source 11. When the voltage of source 11 reaches the gate firing potential of SCR 12, approximately 0.5 volts at 25° C., the SCR is triggered into conduction and a low-impedance path is established between anode 15 and cathode 16, whereby lamp 14 is lit.

In response to the anode-cathode path of SCR 12 being activated into a conducting state, a sudden increase in the voltage across the diode comprising gate electrode 18 and cathode 16 occurs, due to the nature of the silicon device comprising the gate-cathode junction. The sudden increase in the voltage at electrode 18 is on the order of 0.3 volts, so that a sudden increase in the voltage at the cathode 28 of diode 20 from 0.5 to 0.8 volts occurs as the anode-cathode path of SCR 12 is triggered into conduction. Once SCR 12 has been fired, the equivalent low-impedance source of 0.8 volts formed by the junction of gate electrode 18 and SCR cathode 16 is decoupled from the input terminal of integrated circuit 10 and source 11 by diodes 19 and 20 and the bias network therefor regardless of the value of $V_{in}$. For voltages of source 11 less then 0.8 volts, the decoupling is performed by diode 20, while diode 19 decouples source 11 from the circuitry of SCR 12 for values of $V_{in}$ greater than 0.8 volts. If $V_{in}$ is less then 0.8 volts, as it is at the time of triggering of SCR 12, and SCR 12 has been triggered, diode 19 is essentially forward-biased by current from the DC source connected to terminal 25, whereas diode 20 is essentially reverse-biased by the 0.8-volt potential on its cathode. Thereby, diode 20 is essentially an open circuit and the low impedance between the electrodes 16 and 18 of SCR 12 is decoupled from source 11. In contrast, if $V_{in}$ is greater than 0.8 volts, diode 20 is essentially forward-biased by the current from the DC source at terminal 25 and diode 19 is essentially reverse-biased by the voltage of more than 0.8 volts at its cathode 27. Diode 19 is effectively an open circuit so that source 11 is decoupled from the low impedance between control electrode 18 and cathode 16.

As indicated supra, the relative values of resistors 26 and 29 enable the circuit of the present invention to function over the temperature range of −50° C. to +100° C. Operation of an SCR over such a wide range is frequently difficult to achieve because the cathode gate-firing voltage inherently has a tendency to vary in inverse proportion to temperature. Thereby, as temperature increases, the voltage and current required to trigger an SCR into a conducting state has a tendency to decrease. The values of resistors 26 and 29, therefore, must be selected so that, for the highest temperature to be encountered, the cutoff bias applied to electrode 18 is less than the SCR gate-firing voltage for $V_{in}=0$. In contrast, for successful operation the current available to electrode 18 from the network including resistors 26 and 29 and the source at terminal 25 must be high enough to enable the SCR to be activated into a conducting state at the lowest temperature to be encountered. It has been found through design that if resistors 26 and 29 are 200 kilohms and 100 kilohms, respectively, and the DC voltage for terminal 25 is 5 ±0.5 volts, the network of the present invention functions admirably over the stated temperature range.

Once the anode-cathode path of SCR 12 is activated into a conducting state, it remains fired until the end of the half cycle of the full wave-rectified supply fed to terminal 13 during which it was fired. In response to the voltage at terminal 13 dropping below a predetermined, positive voltage during each half cycle thereof, SCR 12 is extinguished and becomes activated during the next half cycle of the AC supply only if the voltage of source 11 exceeds the threshold voltage between gate electrode 18 and cathode 16.

To control the threshold voltage of the network at will, within limits, the circuit of FIG. 1 can be modified by biasing cathode 16 of SCR 12 with a DC voltage derived from source 31, as illustrated in FIG. 2. Increasing the potential of source 31 in the embodiment of FIG. 2 results in a corresponding increase in the threshold voltage required to fire SCR 12. This result occurs because source 31 biases the diode formed by gate electrode 18 and cathode 16 of SCR 12. As the bias of the diode between electrodes 16 and 18 increases, the potential necessary to actuate SCR 12 into a conducting state correspondingly increases. If the voltage applied to cathode 16 of SCR 12 by DC source 31 is negative, then the threshold value of $Vin$ required to fire SCR 12 decreases.

The circuit of FIG. 2 differs from that of FIG 1 in certain other regards, viz: the substitution of a DC source at terminal 13 for the full wave-rectified AC supply and the replacement of indicator lamp 14 by relay coil 32 in the anode circuit of SCR 12. The substitution of the relay coil 32 for indicator lamp 14 has no effect on the circuit operation but is merely illustrated as an exemplary high-power load which could be substituted for lamp 14. The replacement of the full wave-rectified supply for the DC supply, however, enables the circuit of FIG. 2 to be utilized for latching functions. In particular, once SCR 12 is triggered with the circuit of FIG. 2, relay 32 remains activated until normally closed toggle switch 33 in series with the anode-cathode path of SCR 12 and terminal 13, is open-circuited.

A further modification of the invention is illustrated in FIG. 3 wherein the firing voltage for SCR 12 is controlled by replacing diode 20 with three serially connected, similarly poled diodes 35–37. Connecting a plurality of diodes, such as diodes 35–37, between terminal 24 and electrode 18 increases the potential of source 11 necessary to fire SCR 12. This result occurs because of the higher voltage required to effectively forward-bias the plural junctions in series.

In accordance with another aspect of the invention illustrated by FIG. 2, the indicator circuit comprising SCR 12 can be deactivated at will with a switch in the low-power network. In particular, normally open-circuited switch 41, which is closed when it is desired to deactivate the indicator, selectively connects ground potential through diode 42 to terminal 24. Diode 42 is poled so that its anode is connected to terminal 24 and its cathode grounded in response to switch 41 being closed. By closing switch 41, the voltage at terminal 24 is clamped to approximately 0.7 volts, to preclude firing of SCR 12.

While there have been described and illustrated several specific embodiments of the invention, it will be clear that variations in the details of the embodiments specifically illustrated and described may be made without departing from the true spirit and scope of the invention as defined in the appended claims.

I claim:

1. In a voltage amplitude-responsive trigger circuit driven by a high-impedance signal source, The improvement comprising:

a silicon-controlled rectifier switch (SCR) having an anode-cathode path and a gate electrode, the impedance of the gate electrode being at a relatively low level when said SCR is fired, the voltage of the gate electrode increasing suddenly as the SCR is fired, said anode-cathode path having a pair of connectors for receiving a load and a power source;

a terminal for coupling to a DC source;

first diode means having opposed ends, said first diode means being connected to said terminal on one said end and further coupled to said gate electrode of said switch on said other end;

second diode means, said second diode means being connected between said terminal and said high-impedance signal source, said first and second diode means being poled for forward-biasing by a DC source applied to said terminal.

2. The circuit of claim 1 wherein said first diode means includes a plurality of diodes series connected with each other and poled in the same direction.

3. The circuit of claim 1 further including a DC potential in series with the cathode electrode of said switch to bias the junction between the cathode and gate electrode of said switch.

4. The circuit of claim 1 further including a resistor shunting said gate electrode of said switch.

5. The circuit of claim 4 wherein the value of said resistor is selected to bias the gate electrode so that variations of said signal source over a predetermined range are required to fire said switch.

6. The circuit of claim 5 wherein said resistor substantially 100,000 ohms.

7. The circuit of claim 5 further including resistive means in series between the DC source and said terminal the impedance ratio of said resistive means to said shunt resistor being approximately 2:1, the voltage of said DC source being such that the current supplied to the junction of said resistive means and both said diode means is on the order of 25 microamperes.

* * * * *